Jan. 28, 1958     H. C. KNAUSS     2,821,703
THREE COORDINATOR INDICATING DISPLAY
Filed Dec. 16, 1953     3 Sheets-Sheet 1

INVENTOR
HOMER C. KNAUSS
BY
ATTORNEY

INVENTOR
HOMER C. KNAUSS
BY
ATTORNEY

Jan. 28, 1958 H. C. KNAUSS 2,821,703
THREE COORDINATOR INDICATING DISPLAY
Filed Dec. 16, 1953 3 Sheets-Sheet 3

INVENTOR
HOMER C. KNAUSS
BY
ATTORNEY

United States Patent Office 2,821,703
Patented Jan. 28, 1958

2,821,703

THREE COORDINATOR INDICATING DISPLAY

Homer C. Knauss, Lexington, Mass., assignor to Raytheon Manufacturing Company, Newton, Mass., a corporation of Delaware Application December 16, 1953, Serial No. 398,532

6 Claims. (Cl. 343—7.9)

This invention relates to apparatus for displaying three dimensional information from echo ranging equipment on a single viewing screen in simulated perspective.

Heretofore, three dimensional presentations have commonly used two cathode ray tubes, one to show range and azimuth, and the other to show range and height or elevation angle, that is, a combination of PPI and RHI or E scope presentations. The use of two scopes makes it difficult for the operator to visualize the general situation, particularly when there are several targets of interest.

In the display of the present invention, the target is located in the horizontal plane by means of a diamond-shaped grid of lines. Two of these lines intersect at a point that may be somewhat displaced from the center to indicate the location of the equipment. Vertical lines are erected on the pips representing the target. The length of these lines is indicative of the height of the target above the reference plane. The display appears to the observer to be a plane surface viewed obliquely from above with vertical pins representing each target. The range and azimuth can also be represented by a conventional PPI display with vertical lines added at the target pips of a length representing the height of the target above the reference plane. Either display of the invention gives a more realistic representation than the displays heretofore used.

The cartesion coordinate display first mentioned above is constructed with linear scales, both horizontally and vertically, so that the process of interpolation is exactly the same in all parts of the display using the same scale factors for horizontal and vertical coordinates in all parts of the display. This permits more rapid and accurate estimation of distances. Due to the linearity of the scales used, such inaccuracy as there is results in an equal error in all parts of the display. The vertical lines used for representing height do not give the illusion of a greater height near the center of the display than near the edge, as is the case when a radial line is used for this purpose. Furthermore, the presentation requires the invention requires only two scales, one to determine the east-west and north-south coordinates and a second to determine the height. The scale factors for the last two coordinates may be different. Information above the relative positions of two or more points on the display may be more conveniently transmitted to a distance location by means of a voice or other type of communication channel than with other displays. Such a display would be especially useful for surveillance of the region about an airport by air traffic control personnel.

Other and further advantages of this invention will be apparent as the description thereof progresses, reference being had to the accompanying drawings wherein.

Figure 1:
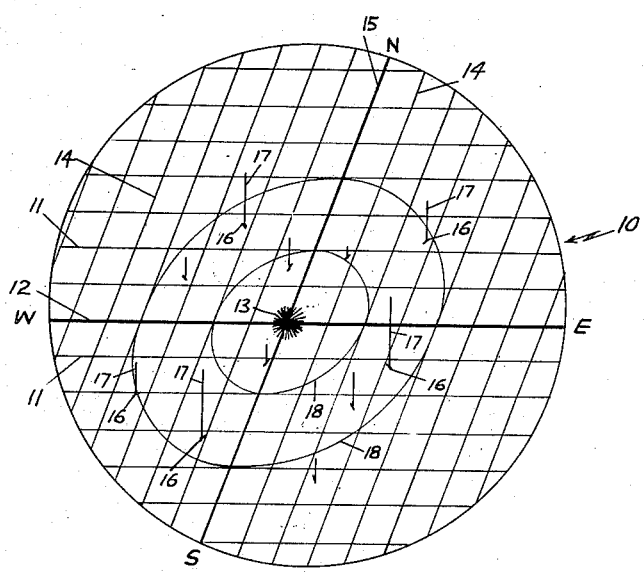
Fig. 1 is a diagrammatic representation of the display in one embodiment of the invention.

In Fig. 1, the reference numeral 10 designates the face plate of a cathode ray tube upon which are traced, by the electron beam, a series of horizontal lines 11, one indicated by the numeral 12 which passes through the spot 13, preferably emphasized, as a reference line. The central spot 13 represents the position of the radar or other point of reference. The lines 11 represent equal increments of distance north and south from the east-west reference line 12 and are the north-south coordinates. A series of parallel lines 14 are drawn at an angle, preferably of seventy degrees to the lines 11. One of these, line 15, passes through the central spot 13 and is preferably emphasized. These slanted lines represent equal increments of distance in the east-west direction and are the east-west coordinates. The positions of targets are indicated by the dots or pips 16. The height of the target above the reference plane is indicated by the length of a vertical line 17, seen to extend upward from each dot. The central spot 13 may be displaced from the center, as shown in Fig. 1, to accommodate any vertical lines 17 projecting beyond the maximum range. By selecting the distance between the horizontal lines to be both proportional to a unit increment of north-south range and a different increment of height, these coordinates can be used for estimating both the north-south location of the target and its height. Lines 18 are auxiliary grid marks that may be produced to show the location of points of equal range.

Figure 2:
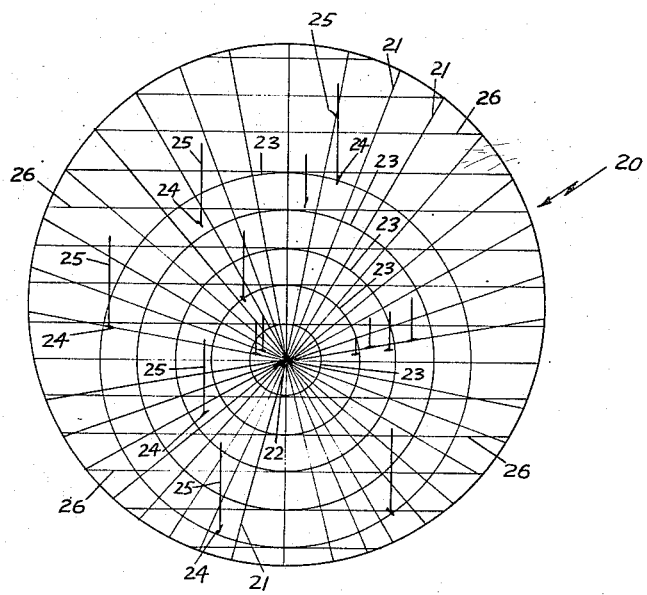
Fig. 2 is a diagrammatic representation of the display in another embodiment of the invention.

If desired, the PPI type of display may be modified to give a three-dimensional effect, as shown in Fig. 2, where the reference numeral 20 designates the face plate of a cathode ray tube upon which are traced, by the electron beam, a series of radial lines 21 radiating from a point 22 that is displaced from the center of the face plate 20, for a purpose to be explained. The point 22 is surrounded by a series of concentric circles 23, having the point 22 as a center and separated by equal distances proportional to a predetermined increment of range so that the concentric circles 23 can be used to determine the range of a target and the radial lines 22 can be used to determine its azimuth. The location of targets is indicated by bright dots 24 upon which are erected vertical lines 25 of a length proportional to the height of the target above the reference plane. The center 22 of the range circles 23 is shown displaced toward the bottom of the display so as to accommodate any height indicating lines 25 that may occur near the outer range circle at the top of the display.

Figure 3:
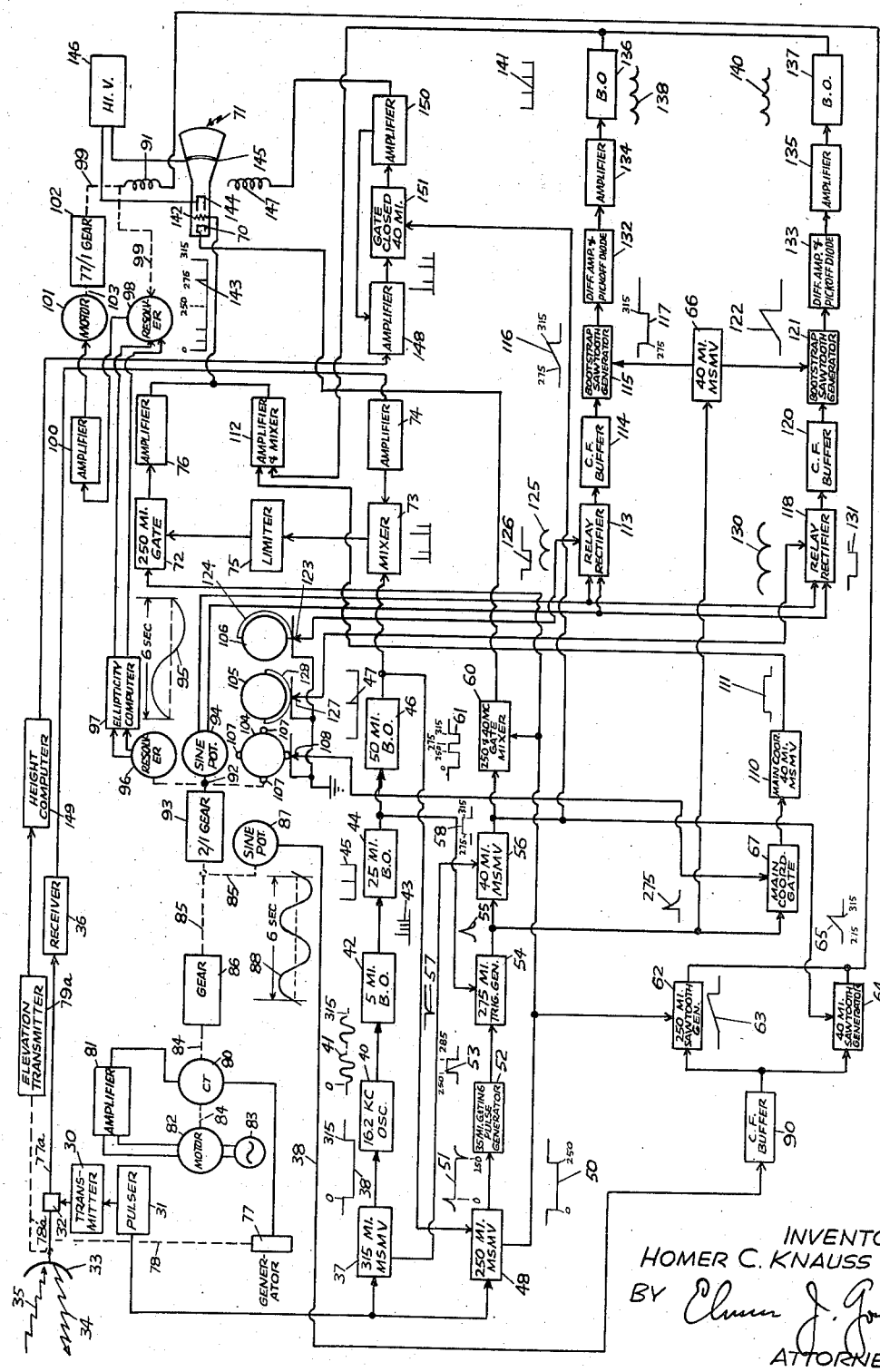
Fig. 3 is a block diagram of the circuitry required to produce the display shown in Fig. 1.

An embodiment of the invention is shown as incorporated in a radar system in Fig. 3 where the reference numeral 30 designates a transmitter that is pulsed by a pulser 31. The pulsed output of the transmitter is passed through the transmit-receive or TR tube 32 to the antenna 33 that propagates the energy in an outward beam, as indicated by the arrow 34. Upon reaching a target, the energy is reflected back to the antenna 33, as indicated by the arrow 35. The received energy passes through the TR tube 32 to a receiver 36 that produces an output comprising pulses at the repetition rate of the transmitted pulses and pulses representing reflections from the various targets. For purposes of illustration, the pulser 31 is assumed to produce pulses at a repetition rate of 225 cycles per second. This gives the system a maximum range of 360 miles.

In a representative embodiment of the invention, the coordinates are separated by a distance indicative of a 50 mile increment in range. The vertical separation also represents 5 miles in height. A maximum range of 240 miles is provided for. Such a display requires sweep, gate, and range marker circuits to supply the following outputs:

(1) Pulses of a repetition rate representing a range of 50 miles for use as elliptical 50 mile markers;
(2) 250 and 40 mile gates for the video circuits;
(3) 250 and 40 mile gates for the cathode ray tube beam intensification;
(4) Main axis trace intensification gates;
(5) 275 mile triggers for grid markers;
(6) 250 and 40 mile linear sweeps.

The oblique grid of coordinates is produced by intensifying the electron beam by pulses applied to either the control grid or the cathode of the cathode ray tube. The beam is deflected by rotating a deflection coil about its neck. The speed of rotation of this rotating deflection coil is varied in a cyclical manner to allow for the deviation between the angle north-south east-west coordinates from the perpendicular. As the deflected electron beam passes a point where it is desired to have a coordinate show, it is intensified by the application of an appropriate pulse to either the cathode or the control grid. These pulses are produced in the circuits hereinafter described.

A portion of the output of the pulser 31 is used to trigger a monostable multivibrator 37 that produces a negative-going pulse of a duration corresponding to a range of 315 miles, as indicated by the wave form 38. This pulse is applied to an oscillator 40 with a 16.2 kilocycle output to gate it on for the duration of the pulse 38, as indicated by the wave form 41. This output of the oscillator 40 is used to trigger a blocking oscillator 42 that produces groups of short pulses at intervals corresponding to a range of 5 miles, as shown by the wave form 43. The pulses 43 are applied to the input of a blocking oscillator 44, or other frequency divider, that produces pulses at intervals corresponding to a range of 25 miles, as indicated by the wave form 45. The pulses 45 are applied to a blocking oscillator 46 to cause it to produce pulses at intervals representing a range of 50 miles, as indicated by the wave form 47.

A portion of the output of the pulser 31 is also applied, together with the output of the 50 mile blocking oscillator 46, to a monostable multivibrator 48 that produces a negative-going pulse of a duration equivalent to a range of 250 miles, as indicated by the wave form 50, that is differentiated to produce the wave form 51. The negative-going trigger resulting from this differentiation is used to trigger a gated pulse generator 52 that produces a positive-going pulse of a duration equivalent to a range of 35 miles, commencing at the end of the 250 mile pulse, as shown in wave form 53. The eleventh pulse of the output of the 25 mile blocking oscillator 44 is selected by the 35 mile gated pulse 53 in the trigger generator 54 that produces a trigger at a time equivalent to a range of 275 miles, as indicated by the wave form 55.

This trigger 55 is applied to a monostable multivibrator 56 that also receives after differentiation the trailing edge of the 315 mile pulse from the multivibrator 37, as indicated by the wave form 57, to produce a positive-going pulse, wave form 58, that commences at a time equivalent to a range of 275 miles and ends at a time equivalent to a range of 315 miles; that is, the multivibrator is triggered on by the trigger 55 and is triggered off by the trigger 57.

The 40 mile gating pulses 58 and the 250 mile pulse 51 are mixed in a mixer 60 to produce a complex pulse pattern represented by wave form 61. The 250 mile pulse 50 is also applied to the input of a 250 mile saw-tooth generator 62 to produce a wave form 63. The 40 mile pulse 58 is applied to the 40 mile saw-tooth generator 64 to produce the wave form 65. The 275 mile trigger 55 is applied to the input to a 40 mile monostable multivibrator 66 for a purpose to be described and to a gate 67 for the main coordinate markers.

The composite gating pulse 61 is applied to the cathode 70 of a cathode ray tube 71. The 250 mile gating pulse 50 is also used to trigger a 250 mile gate 72.

A portion of the video signal from the receiver 36 is mixed with pulses of wave form 47 from the blocking oscillator 46 in mixer 73 after amplification by an amplifier 74. The output of the mixer 73 is limited in a limiting amplifier 75 and passed through a gate 72 where it is gated by a gating pulse of the wave form 50. The output of the gate 72 is applied to amplifier 76. The 50 mile pulses 47 produce the range rings 18 of Fig. 1.

The antenna 33 in the embodiment described is caused to rotate at a speed of 10 R. P. M. This rotation is communicated to a transmitter or generator 77 by means of a shaft or other mechanical linkage indicated by the dotted line 78. The generator 77 develops a voltage having an amplitude and phase indicative of the angular displacement of the antenna 33 in the azimuth plane. This voltage is applied to a synchro control transformer 80. The output of the control transformer 80 is applied after a 90 degree phase shift and amplification in amplifier 81 to supply one phase of a two-phase motor 82, the other phase of which is supplied by a source 83 of alternating current. The motor 82 drives the rotor of the control transformer 80 toward a position of zero output corresponding to zero error between the antenna and the reference shaft 84 to rotate in synchronism with the antenna. This shaft 84 drives a second shaft 85 through a gear box 86 at a speed twice that of the antenna's rotation. This shaft 85 drives a sine potentiometer 87 that produces a voltage proportional to the sine of twice the azimuth angle of the antenna, as shown in wave form 88. This voltage is applied through a buffer cathode follower 90 to an input of the 250 mile saw-tooth generator 62 and to an input of the 40 mile saw-tooth generator 64. The outputs of the saw-tooth generators are combined and applied to a coil 91 that is mounted for rotation about the cathode ray tube 71 to produce a radial reflection on the electron beam.

The shaft 85 drives a third shaft 92 through a two-to-one reduction gear 93. The shaft 92 drives a potentiometer 94 that produces a voltage that varies as the sine of the angular displacement of the antenna, as shown by the wave form 95. This shaft 92 also drives the rotor of a resolver 96 that receives a reference potential and, as its rotor revolves, produces two output voltages, one proportional to the sine of the angle of rotation and the other proportional to the co-sine of the angle of rotation. These outputs are applied through an ellipticity computer 97 to be described later to corresponding windings of a second resolver 98 driven by the same shaft 99 that drives the coil 91. The output of the resolver 98 is used after amplification in amplifier 100 to supply one phase of a two-phase motor 101. This motor drives the deflection coil 91 of the cathode ray tube 71 through a reduction gear box 102 and shafts 103 and 99.

Three cams 104, 105, and 106 are driven by the shaft 92. Cam 104 is formed with four equally spaced projections 107 that in turn contact and close a switch 108 that applies ground potential to the suppressor grid of a pentode in the main coordinate gate 67 every quarter revolution of one and one-half seconds to permit the 275 mile triggers 55 to pass to a monostable multivibrator 110 and trigger it to produce a pulse occurring at a time indicating a 275 mile range and lasting for a period indicating a range of 40 miles, as indicated by the wave form 111. This pulse is applied to the input to the amplifier and mixer 112.

The output of the sine potentiometer 94 is applied through a relay 113 and a buffer amplifier 114 to a boot strap saw-tooth generator 115 that produces a saw-tooth wave form 116 that commences at a time corresponding to a range of 275 miles and reaches its maximum at a range of 315 miles. This generator 115 also receives a negative-going pulse 117 commencing at a time corresponding to a range of 275 miles and lasting for a time corresponding to 40 miles that is produced by the 40 mile monostable multivibrator 66.

The output of the sine potentiometer 94 is also applied through a relay 118 and a buffer amplifier 120 to a boot strap saw-tooth generator 121 that produces a second saw-tooth wave form 122 similar to the wave form 116, since the generator 121 is also gated by the pulse 117 from the multivibrator 66.

The relay 113 is controlled by means of the completion of its supply circuit by means of a switch 123 closed by the passage of a 180 degree raised surface 124 on the cam 106 to permit one-half of the rectified sine wave output 125 of a potentiometer 94 to generate a negative pulse 126 that, after amplification, serves to trigger the saw-tooth generator 115. Similarly, the relay 118 is controlled by a switch 127 closed by a similar 180 degree raised surface 128 on the cam 105 that is arranged so as to be 90 degrees out of phase with the surface 124. This produces half a sinusoidal wave form 130, 90 degrees out of phase with a similar wave form 125. A negative pulse 131 is generated that occurs for the duration of the central positive alternation of the wave form 130.

The saw-tooth wave form 116 is applied to one input of a differential amplifier 132. There are seven of these amplifiers and the saw-tooth is connected to one input of each of them. A second input of each amplifier is connected to a different fixed voltage. The saw-tooth wave form 122 is applied to one input of a second set of six such amplifiers 133. The plates of the two stages of each of these differential amplifiers are connected by a diode so that a positive pulse is produced every time the saw-tooth reaches the fixed grid potential of the second tube of one of these amplifiers. The outputs of these amplifiers are coupled through an amplifier 134 or 135 associated with the set of seven differentials m-plifiers or the set of six, respectively, to trigger a blocking oscillator 136 or 137. These triggers, wave forms 138 and 140, cause the blocking oscillators 136 and 137 to produce a train of pulses represented by the wave form 141 that is combined in the amplifier 112 with the pulses 11 from the main coordinate multivibrator 110 and are applied to the grid 142 of the cathode ray tube 71 where they combine with the output of amplifier 76 to produce the complex grid marking pulses shown by the wave form 143.

The cathode ray tube 71 has a first anode 144 and a second anode 145 supplied with a high potential from a source 146. In addition to the rotating deflection coil 91, the cathode ray tube 71 is also provided with a fixed deflection coil 147.

The antenna 33 is also rotated in elevation. This motion is communicated by shaft 78a to an elevation transmitter 77a in which a potential proportional to the angular displacement of the antenna in elevation is produced and applied, together with a portion of the output of the receiver, to a height computer 149 that produces a pulse that varies in amplitude with height. Other means for obtaining such pulses are well known in the art and may be substituted for the means shown. These pulses from the height computer 149 are amplified in amplifiers 148 and 150 and applied to the deflection coil 147 to deflect the beam a distance proportional to the height of the target. These height pulses are gated off in a gate 151 by pulses of the wave form 58 from the multivibrator 56 during the 40 mile portion of the sweep beyond the 275 mile range.

Figure 4:
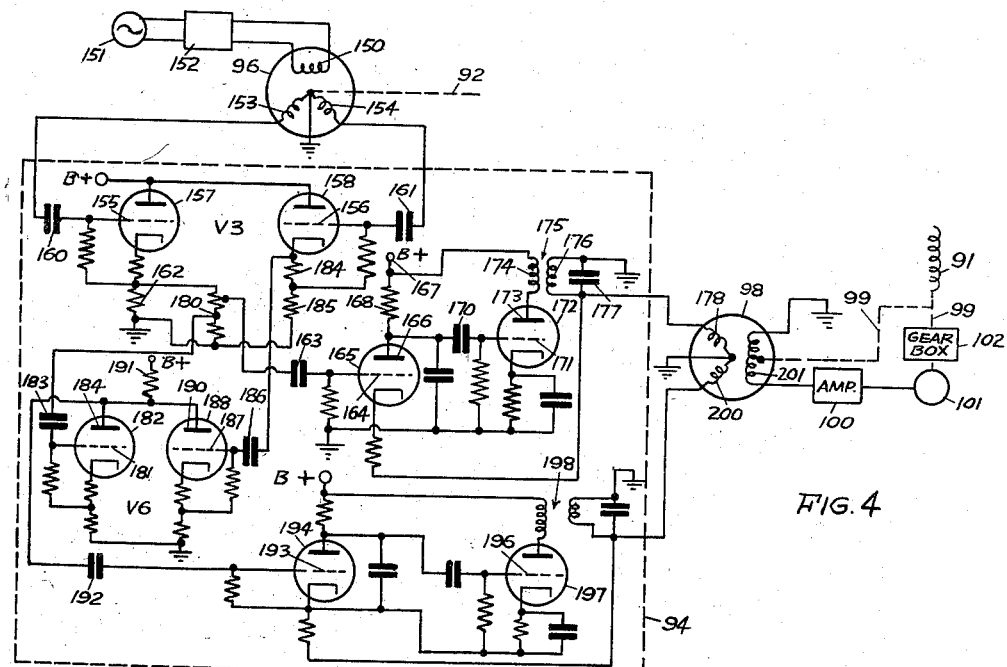
Fig. 4 is a schematic diagram of the servo system used in the embodiment of the invention shown in Fig. 3.

The circuits associated with the ellipticity computer 97 are shown in greater detail in Fig. 4. These circuits are required to allow for the skewing of the coordinate which requires the angular velocity of the deflection coil 87 to be varied cyclically in accordance with the relationship.

$$\tan \theta' = \cot a + \cosec a \tan \theta$$

where $\theta$ is the angular position of the antenna 33
$a$ is the angle between the east-west and north-south axis in the presentation shown in Fig. 1, as 70 degrees and
$\theta'$ is the corresponding angular position of the deflecting coil 91.

It can be shown that this equality is satisfied if $$\sin \theta' = \sin \theta + \cos a \cos \theta$$

and $$\cos \theta' = \sin a \cos \theta$$

As shown in Fig. 4, a reference winding 150 on the resolver 96 is supplied with current from a source 151 that is shifted 90 degrees in phase by a phase shifter 152. The output windings 153 and 154 are connected to the grids 155 and 156 of triodes 157 and 158, respectively, through capacitors 160 and 161. The output of the triode 157 is taken from the cathode load resistor 162 and coupled through a capacitor 163 to the grid 164 of a triode 165. The plate 166 is connected to a source 167 of positive potential through a resistor 168 and is coupled through a capacitor 170 to the grid 171 of a triode 172, the plate 173 of which is connected to the source 167 through the primary 174 of a transformer 175. The secondary 176 is shunted by a capacitor 177 and connected to one winding 178 of the resolver 98, the rotor of which is attached to the shaft 99. A portion of the output of the tube 157 is taken off a voltage divider 180 and coupled to the grid 181 of a triode 182 through a capacitor 183. The output of the triode 158 is developed across its cathode resistors 184 and 185 and coupled through a capacitor 186 to the grid 187 of a triode 188, the plate 190 of fhich has a load resistor 191 in common with the plate 184. The plates 184 and 190 are coupled through a capacitor 192 to the grid 193 of a triode 194. The plate 195 is coupled to the grid 196 of a triode 197, the output of which is coupled through a transformer 198 to a second winding 200 of the resolver 98.

The voltage induced in the third winding 201 of this resolver is applied to the motor 101 after amplification in an amplifier 100 to control the rotation of the shaft 99 that drives the coil 91.

In operation, a voltage proportional to $\cos \theta$ is developed across the whole cathode load resistor 162. A portion of this voltage proportional to $\cos a \cos \theta$ is developed at the tap of the voltage divider 180 and delivered to the grid 181 of the triode 182. A voltage proportional to $\sin \theta$ is applied to the grid 156 of the tube 158, and the output taken from the cathode resistor 184 is applied to the grid 187 of the tube 188. The output of this tube is combined with the output of tube 182 and after amplification is applied to the winding 200 of the resolver 104. A voltage proportional to $\sin a \cos \theta$ is developed across resistor 180 and applied to the grid 164 of the tube 165 that after amplification is applied to the winding 178 of resolver 98. The circuit is adjusted so that the position of the rotor of the resolver 98 corresponding to zero output voltage will be the angular position of the rotating coil corresponding to that of the antenna 33. In case of angular error, an error voltage is induced in the rotor winding of the resolver 98. This error voltage is amplified in amplifier 100 and drives the motor 101. The motor drives the rotor of the resolver 98 through reduction gearing 102 to the position of zero output voltage. Thus, the desired ellipticity is introduced into the display.

Figure 5:
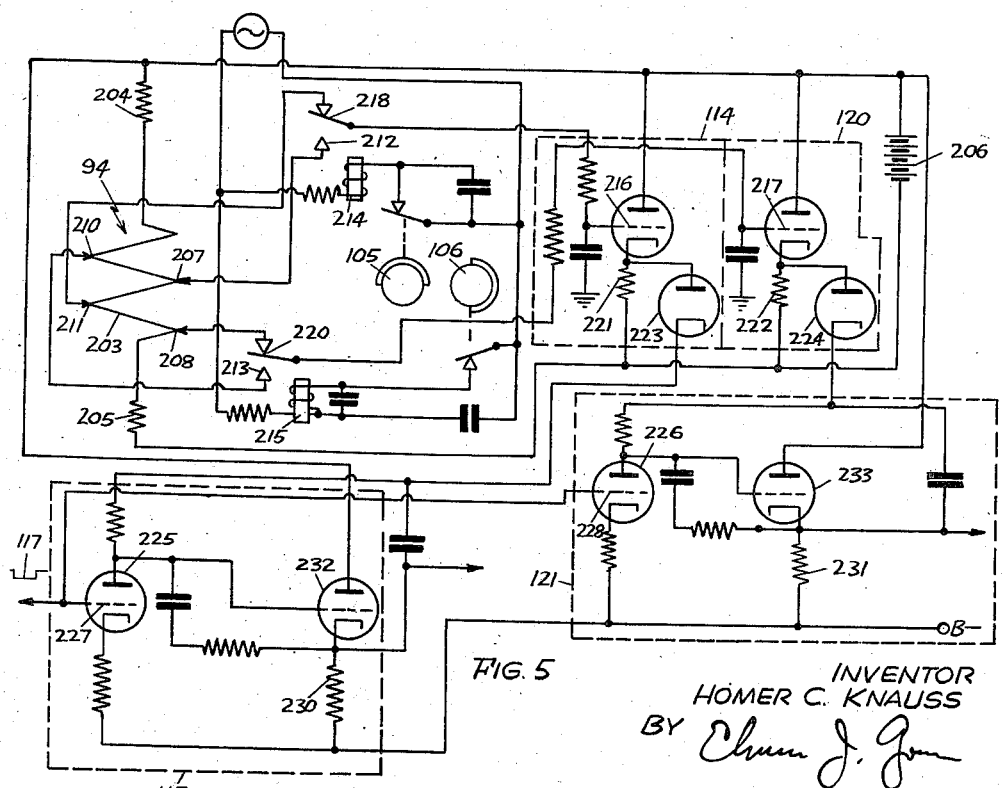
Fig. 5 is a schematic diagram of a portion of the sweep generating circuit shown in Fig. 3.

The cams 105 and 106, the relay rectifiers 113 and 118, the cathode follower buffer amplifiers 114 and 120, and the boot strap saw-tooth generators 115 and 121, mentioned earlier, are shown in greater detail in Fig. 5. The sine potentiometer 94 is represented by the zig-zag line 203 and is connected in series with two resistors 204 and 205 across a potential source 206. A voltage proportional to the sine of the angular rotation of the potentiometer is obtained between brushes 207 and 208 and a voltage proportional to the cosine of the angular rotation of the potentiometer is obtained between brushes 210 and 211. Brushes 207 and 210 are connected over normally-open contacts 212 and 213 on relays 214 and 215 to the grids 216 and 217 of cathode followers 114 and 120, respectively. Brushes 208 and 211 are connected to the grids 216 and 217 of the cathode followers 114 and 120 over normally-closed contacts 218 and 220 on the relays 214 and 215. The voltage developed across the cathode resistors 221 and 222 is rectified in diodes 223 and 224, and applied to the plates of the first tubes 225 and 226 of the boot strap saw-tooth generators 115 and 121, respectively. The gating pulse 117 is applied to the grids 227 and 228 of the tubes 225 and 226. The output is developed across the cathode resistors 230 and 231 of the second tubes 232 and 233 of the generators 115 and 121, respectively. The result is a saw-tooth wave form occurring in the output of the boot strap saw-tooth generators 115 and 121 at a time corresponding to a range of 275 miles, reaching its maximum at a time corresponding to a range of 315 miles.

The displaced PPI display of Fig. 2 with its range rings 23 and radio azimuth indicators 21 may be produced by any of the well-known methods for producing such a display. The height indicating vertical lines 25 are generated in the manner shown in Fig. 3. The horizontal lines 26 that serve as an aid in estimating the heights of targets are also generated in the same manner as the horizontal lines 14 in the display shown in Fig. 1. While the embodiment of the invention illustrated has magnetic deflection, electrostatic deflection may be used. Other methods of generating the coordinate markers of these displays will occur to those skilled in the art.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. Apparatus for simulating a three dimensional display comprising a cathode ray tube having deflecting elements, beam intensity control means, and a luminescent screen, sweep generating circuits controlling two of said deflecting elements to produce displacements of the electron beam representative of two of the dimensions, reference marking circuits for electronically producing reference indicia on the display, means for producing a unidirectional pulse of electrical energy proportional in amplitude to the third dimension, and means for applying this pulse to the third deflecting means to produce a deflection proportional to the third dimension.

2. Apparatus for simulating a three dimensional display comprising a cathode ray tube having deflecting elements, beam intensity control means, and a luminescent screen, sweep generating circuits controlling two of said deflecting elements to produce displacements of the electron beam representative of two of the dimensions, reference marking circuits for electronically producing reference indicia on the display comprising two sets of parallel lines at an acute angle to each other, means for producing a unidirectional pulse of electrical energy proportional in amplitude to the third dimension and means for applying this pulse to the third deflecting means to produce a deflection proportional to the third dimension perpendicular to one of said sets of parallel lines.

3. Apparatus for simulating a three dimensional display comprising a cathode ray tube having deflecting elements, beam intensity control means, and a luminescent screen, sweep generating circuits controlling two of said deflecting elements to produce displacements of the electron beam representative of two of the dimensions, reference marking circuits for electronically producing reference indicia on the display comprising a set of concentric circles, a set of radial lines about a center displaced from the center of the luminescent screen and a set of parallel lines, means for producing a unidirectional pulse of electrical energy proportional in amplitude to the third dimension and means for applying this pulse to the third deflecting means to produce a deflection proportional to the third dimension perpendicular to said set of parallel lines.

4. Apparatus for representing the location of an object in three dimensions comprising a cathode ray tube having deflecting elements, beam intensity control means, and a luminescent screen, sweep generating circuits controlling two of said deflecting elements including a bearing scan sweep generator and a range scan sweep generator, reference marking circuits for electronically producing reference indicia on the display, means for producing a unidirectional pulse of electrical energy proportional in amplitude to the height of the object and means for applying this pulse to the third deflecting means to produce a deflection proportional to height.

5. Apparatus for representing the location of an object in three dimensions comprising a cathode ray tube having deflecting elements, beam intensity control means, and a luminescent screen, sweep generating circuits controlling two of said deflecting elements including a bearing scan sweep generator and a range scan sweep generator, reference marking circuits for electronically producing within the display reference indicia comprising two sets of parallel lines at an acute angle to each other, means for producing a unidirectional pulse of electrical energy proportional in amplitude to the height of the object, and means for applying this pulse to the third deflecting means to produce a deflection proportional to height perpendicular to one of said sets of parallel lines.

6. Apparatus for representing the location of an object in three dimensions comprising a cathode ray tube having deflecting elements, beam intensity control means, and a luminescent screen, sweep generating circuits controlling two of said deflecting elements including a bearing scan sweep generator and a range scan sweep generator, reference marking circuits for electronically producing within the display reference indicia comprising a set of concentric circles and a set of radial lines about a center displaced from the center of the luminescent screen and a set of parallel lines, means for producing a unidirectional pulse of electrical energy proportional in amplitude to the height of the object, and means for applying this pulse to the third deflecting means to produce a deflection proportional to height perpendicular to said set of parallel lines.

References Cited in the file of this patent

UNITED STATES PATENTS

| | | |
|---|---|---|
| 2,436,655 | Locke | Feb. 24, 1948 |
| 2,467,319 | King | Apr. 12, 1949 |